United States Patent
Dabak

(10) Patent No.: US 6,724,828 B1
(45) Date of Patent: Apr. 20, 2004

(54) MOBILE SWITCHING BETWEEN STTD AND NON-DIVERSITY MODE

(75) Inventor: Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/303,018

(22) Filed: Apr. 30, 1999

Related U.S. Application Data
(60) Provisional application No. 60/116,268, filed on Jan. 19, 1999.

(51) Int. Cl.[7] ............................. H04B 7/02; H04L 1/02
(52) U.S. Cl. .................... 375/267; 375/347; 375/349
(58) Field of Search ............................ 375/144, 148, 375/267, 299, 349, 260, 347; 455/101, 103, 105, 140

(56) References Cited

U.S. PATENT DOCUMENTS

| | | | |
|---|---|---|---|
| 5,940,432 A | * 8/1999 | Saito et al. | |
| 6,141,536 A | * 10/2000 | Cvetkovic et al. | ............ 455/45 |
| 6,333,926 B1 | * 12/2001 | Van Heeswyk et al. | .... 370/335 |
| 6,356,605 B1 | * 3/2002 | Hosur et al. | ................ 375/347 |
| 6,408,039 B1 | * 6/2002 | Ito | .............................. 375/347 |

* cited by examiner

*Primary Examiner*—Phoung Phu
(74) *Attorney, Agent, or Firm*—Ronald O. Neerings; Wade James Brady, III; Frederick J. Telecky, Jr.

(57) ABSTRACT

A communication circuit is designed with a detector circuit (720) coupled to receive a first signal. The detector circuit is arranged to produce a multipath signal corresponding to a number of paths of the first signal. A comparator circuit (726) is coupled to receive the multipath signal and a threshold signal. The comparator circuit is arranged to produce a diversity signal in response to a comparison of the multipath signal and the threshold signal. The diversity signal has a first logic state for enabling diversity and has a second logic state for disabling diversity.

18 Claims, 3 Drawing Sheets

MOBILE SWITCHING BETWEEN STTD AND NON-DIVERSITY MODE

This application claims the benefit of Provisional application Ser. No. 60/116,268, filed Jan. 19, 1999.

FIELD OF THE INVENTION

This invention relates to wideband code division multiple access (WCDMA) for a communication system and more particularly to circuit for switching between space time block coded transmit antenna diversity and non-diversity for WCDMA.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in Provisional U.S. patent application Ser. No. 09/205,029, filed Dec. 3, 1998, and incorporated herein by reference. These WCDMA systems are coherent communications systems with pilot symbol assisted channel estimation schemes. These pilot symbols are transmitted as quadrature phase shift keyed (QPSK) known data in predetermined time frames to any receivers within range. The frames may propagate in a discontinuous transmission (DTX) mode. For voice traffic, transmission of user data occurs when the user speaks, but no data symbol transmission occurs when the user is silent. Similarly for packet data, the user data may be transmitted only when packets are ready to be sent. The frames include pilot symbols as well as other control symbols such as transmit power control (TPC) symbols and rate information (RI) symbols. These control symbols include multiple bits otherwise known as chips to distinguish them from data bits. The chip transmission time ($T_C$), therefore, is equal to the symbol time rate (T) divided by the number of chips in the symbol (N).

Previous studies have shown that multiple transmit antennas may improve reception by increasing transmit diversity for narrow band communication systems. In their paper *New Detection Schemes for Transmit Diversity with no Channel Estimation*, Tarokh et al. describe such a transmit diversity scheme for a TDMA system. The same concept is described in *A Simple Transmitter Diversity Technique for Wireless Communications* by Alamouti. Tarokh et al. and Alamouti, however, fail to teach such a transmit diversity scheme for a WCDMA communication system.

Referring to FIG. 1, there is a simplified block diagram of a typical transmitter using Space Time Transit Diversity (STTD) of the prior art that is compatible with WCDMA. The transmitter circuit receives pilot symbols, TPC symbols, RI symbols and data symbols on leads 100, 102, 104 and 106, respectively. Each of the symbols is encoded by a respective STTD encoder as will be explained in detail. Each STTD encoder produces two output signals that are applied to multiplex circuit 120. The multiplex circuit 120 produces each encoded symbol in a respective symbol time of a frame. Thus, a serial sequence of symbols in each frame is simultaneously applied to each respective multiplier circuit 124 and 126. A channel orthogonal code $C_m$ is multiplied by each symbol to provide a unique signal for a designated receiver. The STTD encoded frames are then applied to antennas 128 and 130 for transmission.

Turning now to FIG. 2, there is a block diagram showing signal flow in an STTD encoder of the prior art that may be used with the transmitter of FIG. 1. The STTD encoder receives symbol $S_1$ at symbol time T and symbol $S_2$ at symbol time 2T on lead 200. The STTD encoder produces symbol $S_1$ on lead 204 and symbol $-S_2^*$ on lead 206 at symbol time T, where the asterisk indicates a complex conjugate operation. Furthermore, the symbol time indicates a relative position within a transmit frame and not an absolute time. The STTD encoder then produces symbol $S_1$ on lead 204 and symbol $S_1^*$ on lead 206 at symbol time 2T. The bit or chip signals of these symbols are transmitted serially along respective paths 208 and 210. Rayleigh fading parameters are determined from channel estimates of pilot symbols transmitted from respective antennas at leads 204 and 208. For simplicity of analysis, a Rayleigh fading parameter $\alpha_j^1$ is assumed for a signal transmitted from the first antenna 204 along the $j^{th}$ path. Likewise, a Rayleigh fading parameter $\alpha_j^2$ is assumed for a signal transmitted from the second antenna 206 along the $j^{th}$ path. Each $i^{th}$ chip or bit signal $r_j(i+\tau_j)$ of a respective symbol is subsequently received at a remote mobile antenna 212 after a transmit time $\tau_j$ corresponding to the $j^{th}$ path. The signals propagate to a despreader input circuit (FIG. 6) where they are summed over each respective symbol time to produce output signals $R_j^1$ and $R_j^2$ corresponding to the $j^{th}$ of L multiple signal paths as previously described.

Referring now to FIG. 3, there is a schematic diagram of a phase correction circuit of the prior art that may be used with a remote mobile receiver. This phase correction circuit receives signals $R_j^1$ and $R_j^2$ as input signals on leads 612 and 614 as shown in equations [1–2], respectively.

$$R_j^1 = \sum_{i=0}^{N-1} r_j(i+\tau_j) = \alpha_j^1 S_1 - \alpha_j^2 S_2^* \qquad [1]$$

$$R_j^2 = \sum_{i=N}^{2N-1} r_j(i+\tau_j) = \alpha_j^1 S_1 + \alpha_j^2 S_1^* \qquad [2]$$

The phase correction circuit receives a complex conjugate of a channel estimate of a Rayleigh fading parameter $\alpha_j^{1*}$ corresponding to the first antenna on lead 302 and a channel estimate of another Rayleigh fading parameter $\alpha_j^2$ corresponding to the second antenna on lead 306. Complex conjugates of the input signals are produced by circuits 308 and 330 at leads 310 and 322, respectively. These input signals and their complex conjugates are multiplied by Rayleigh fading parameter estimate signals and summed as indicated to produce path-specific first and second symbol estimates at respective output leads 318 and 322 as in equations [3–4].

$$R_j^1 \alpha_j^{1*} + R_j^{2*} \alpha_j^2 = (|\alpha_j^1|^2 + |\alpha_j^2|^2) S_1 \qquad [3]$$

$$-R_j^{1*} \alpha_j^2 + R_j^2 \alpha_j^{1*} = (|\alpha_j^1|^2 + |\alpha_j^2|^2) S_2 \qquad [4]$$

These path-specific symbol estimates are then applied to a rake combiner circuit to sum individual path-specific symbol estimates, thereby providing net soft symbols as in equations [5–6].

$$\tilde{S}_1 = \sum_{j=1}^{L} R_j^1 \alpha_j^{1*} + R_j^{2*} \alpha_j^2 \quad [5]$$

$$\tilde{S}_2 = \sum_{j=1}^{L} -R_j^{1*} \alpha_j^2 + R_j^2 \alpha_j^{1*} \quad [6]$$

These soft symbols or estimates provide a path diversity L and a transmit diversity 2. Thus, the total diversity of the STTD system is 2L. This increased diversity is highly advantageous in providing a reduced bit error rate.

A problem with the 2L STTD diversity arises when L becomes too large. This is because the phase correction circuit (FIG. 3) of the mobile receiver must perform 2L complex multiply and 2L complex add operations for each symbol. The resulting complexity may substantially increase, for example, to L>12 in a vehicular environment or during soft handoff when the mobile receiver moves between cells. These operations greatly increase processing complexity for the mobile receiver. Moreover, advantages of diversity diminish for values of L>6 and may not improve reception.

SUMMARY OF THE INVENTION

These problems are resolved by a communication circuit, comprising a detector circuit coupled to receive a first signal. The detector circuit is arranged to produce a multipath signal corresponding to a number of paths of the first signal. A comparator circuit is coupled to receive the multipath signal and a threshold signal. The comparator circuit produces a diversity signal in response to a comparison of the multipath signal and the threshold signal. The diversity signal has a first logic state for enabling diversity and a second logic state for disabling diversity.

The present invention improves reception and reduces circuit complexity by providing a circuit at the mobile receiver to selectively enable and disable diversity. No additional transmit power or bandwidth is required. Power is balanced across multiple antennas.

BRIEF DESCRIPTION OF THE DRAWINGS

A more complete understanding of the invention may be gained by reading the subsequent detailed description with reference to the drawings wherein.

DETAILED DESCRIPTION OF THE PREFERRED EMBODIMENTS

Figure 1:
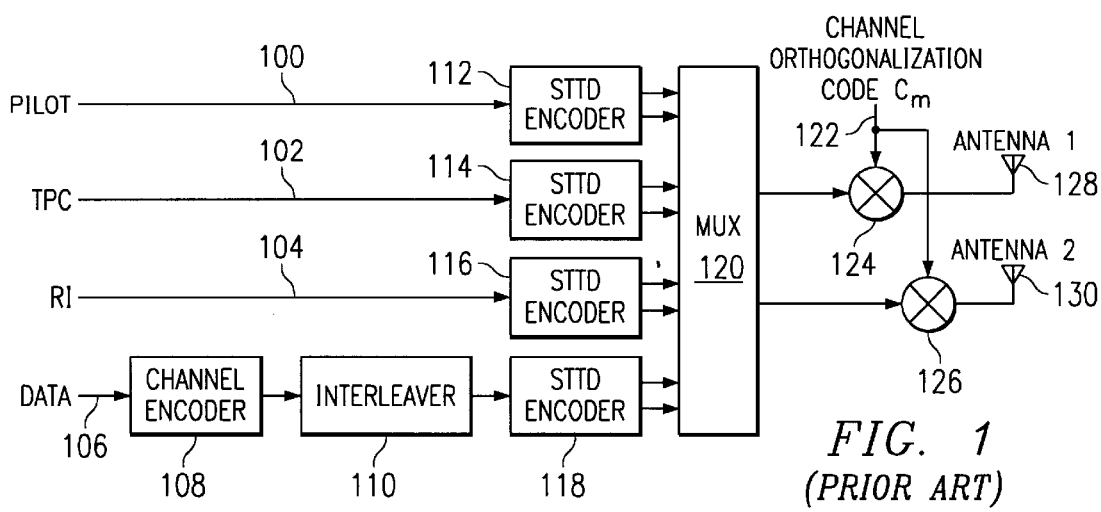
FIG. 1 is a simplified block diagram of a typical transmitter using Space Time Transit Diversity (STTD) of the prior art.
Figure 4A:
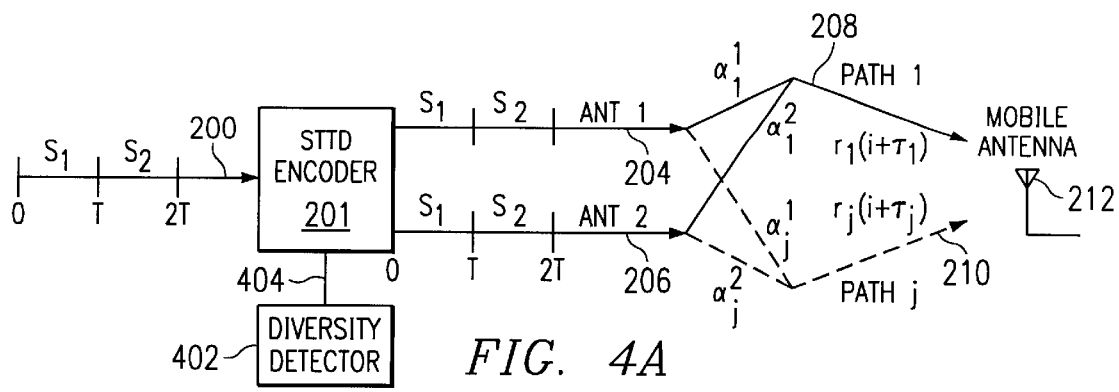
FIG. 4A is a block diagram showing signal flow in an STTD encoder of a first embodiment of the present invention with diversity disabled.

Referring now to FIG. 4A, there is a block diagram showing signal flow in an STTD encoder of a first embodiment of the present invention that may be used with the transmitter of FIG. 1. Diversity detector circuit 402 receives a diversity signal from a mobile receiver indicating that diversity is to be enabled or disabled. This diversity signal is preferably communicated to the base station in the reverse link on the dedicated physical control channel (DPCCH). The diversity detector latches the diversity signal and applies it to STTD encoder circuit 201 via lead 404.

Figure 2:
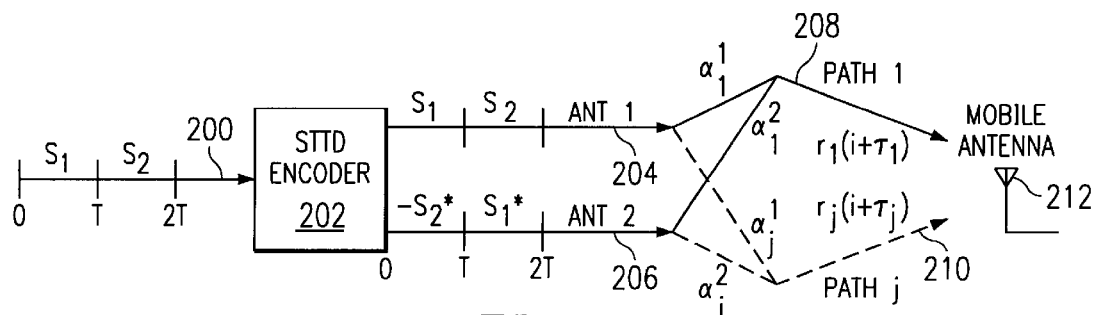
FIG. 2 is a block diagram showing signal flow in an STTD encoder of the prior art that may be used with the transmitter of FIG. 1.

The STTD encoder operates in diversity mode as previously described with respect to FIG. 2 for a first state of the diversity signal. In response to a second state of the diversity signal, however, the STTD encoder produces symbol $S_1$ on leads 204 and 206 at symbol time T, and produces symbol $S_2$ on leads 204 and 206 at symbol time 2T. This symmetrical transmission under non-diversity is advantageous in maintaining a power amplifier balance between transmit antennas at the base station. The bit or chip signals of these symbols are transmitted serially along respective paths 208 and 210. Rayleigh fading parameters are determined from channel estimates of pilot symbols transmitted from respective antennas at leads 204 and 208. A Rayleigh fading parameter $\alpha_j^1$ is assumed for a signal transmitted from the first antenna 204 along the $j_{th}$ path. Likewise, a Rayleigh fading parameter a is assumed for a signal transmitted from the second antenna 206 along the $j^{th}$ path. Each $i^{th}$ chip or bit signal $r_j(i+\tau_j)$ of a respective symbol is subsequently received at a remote mobile antenna 212 after a transmit time $\tau_j$ corresponding to the $j^{th}$ path.

Figure 5:
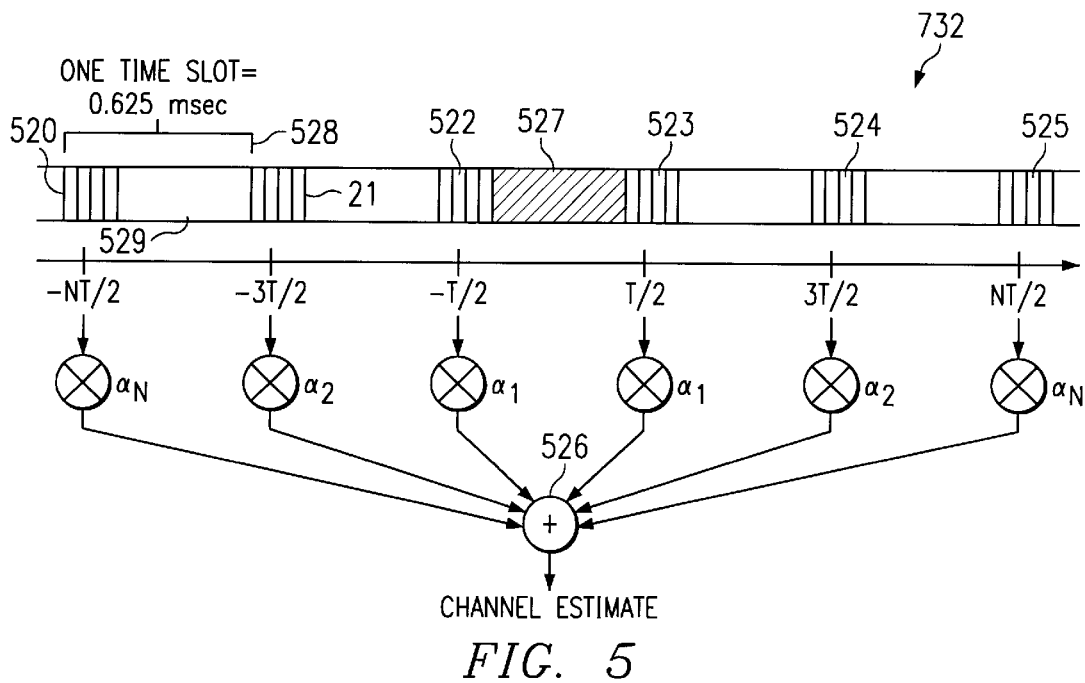
FIG. 5 is a diagram showing the WMSA method of channel estimation of the prior art.

Turning now to FIG. 5, there is a diagram showing a weighted multi-slot averaging (WMSA) circuit 732 of the prior art for channel estimation. In operation, a signal buffer circuit 706 (FIG. 7) receives individual frames of data having a predetermined time period of preferably 10 milliseconds. Each frame is subdivided into sixteen equal time slots of 0.625 milliseconds each. Each time slot, for example time slot 528, includes a respective set of pilot symbols 520, data symbols 529, a TPC symbol (not shown) and control symbols (not shown). For a data rate of 32 K symbols per second (KSPS), for example, each time slot includes twenty symbols. The first four of these symbols are pilot symbols and the last three are control symbols. Between the pilot and control symbols are twelve data symbols such as voice data and one TPC symbol.

The signal buffer applies pilot symbols from six time slots to the WMSA channel estimate circuit 732 in parallel via bus 730. The WMSA channel estimate of a particular time slot, for example time slot 527, is determined by a weighted average of N sets of pilot symbols 520–522 before and N sets of pilot symbols 523–525 after the time slot of interest. These pilot symbols 520–525 are multiplied by their respective weighting constants $\alpha_1$–$\alpha_N$ and summed by circuit 526 to provide a channel estimate. The WMSA channel estimate circuit produces separate channel estimates $\alpha_j^1$ and $\alpha_j^2$ on leads 734 and 736 (FIG. 7), respectively. Each separate channel estimate corresponds to a respective base station diversity antenna and to a $j^{th}$ signal path.

Figure 6:
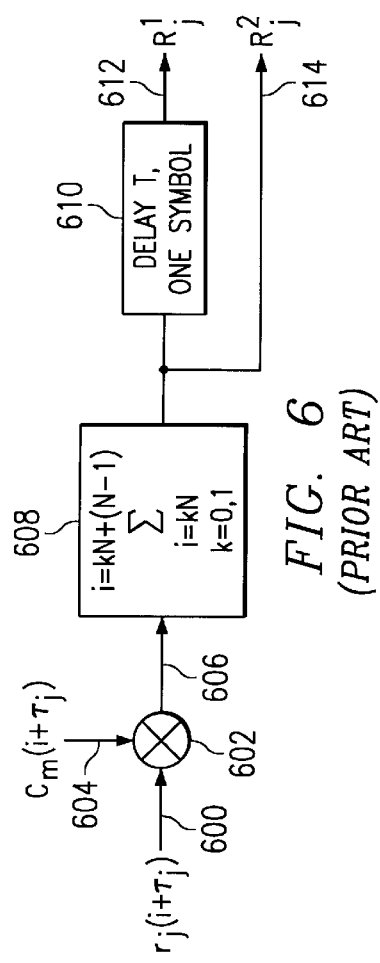
FIG. 6 is a block diagram of a despreader circuit of the prior art.

Referring now to FIG. 6, there is a despreader circuit of the prior art that may be included in signal buffer 706 (FIG.

7). Received signals from mobile antenna 212 propagate to the despreader circuit (FIG. 6) where they are summed over each respective symbol time to produce output signals $R_j^1$ and $R_j^2$ corresponding to the $j^{th}$ of L multiple signal paths as previously described. The despreader circuit receives the $i^{th}$ of N chip signals per symbol together with noise along the $j_{th}$ of L multiple signal paths at a time $\xi_j$ after transmission. Both here and in the following text, noise terms are omitted for simplicity. This received signal $r_j(i+\tau_j)$ at lead 600 is multiplied by a channel orthogonal code signal $C_m(i+\tau_j)$ at lead 604 that is unique to the receiver. Each chip signal is summed over a respective symbol time by circuit 608 and produced as first and second output signals $R_j^1$ and $R_j^2$ on leads 612 and 614 as in equations [1–2], respectively. Delay circuit 610 provides a one-symbol delay T so that the output signals are produced simultaneously.

Figure 7:
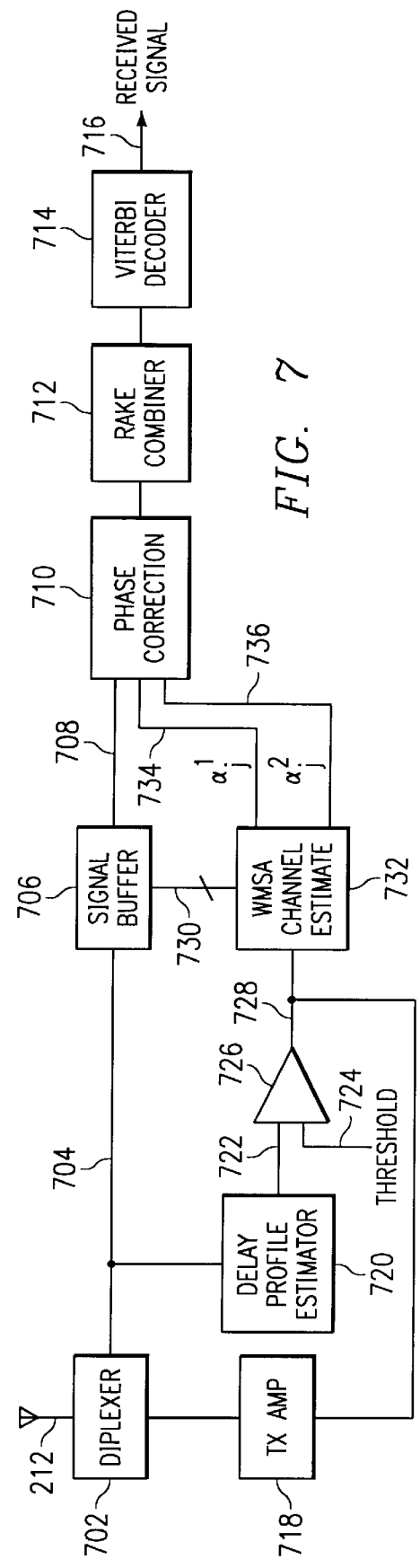
FIG. 7 is a block diagram of a mobile receiver of the present invention with diversity selection.

Referring now to FIG. 7, operation of a mobile receiver of the present invention will be described in detail. Mobile antenna 212 receives signals transmitted by base station diversity antennas 128 and 130, respectively. Diplexer circuit 702 couples these received signals to lead 704 during receive mode operation. Delay profile estimator circuit 720 includes a despreader circuit as in FIG. 6 and a match filter circuit (not shown). The delay profile estimator circuit 720 determines a total number of received multiple path signals on lead 704 from a number of orthogonal code matches completed by the match filter circuit. This number of multiple path signals or multipath signal is applied to comparator circuit 726 via lead 722. A threshold signal is applied to another input terminal of comparator circuit 726 on lead 724. The comparator circuit produces a diversity signal on lead 728 in response to a comparison of the multipath signal and the threshold signal. This threshold signal is preferably set to correspond to six (L) multiple paths for a total transmit diversity of twelve (2L). When the multipath signal is less than this threshold, the mobile receiver gain is enhanced under diversity as previously described. When the multipath signal is greater than or equal to this threshold number, however, there is only marginal gain improvement in the received signal. Thus, the diversity signal logic state at lead 728 changes to disable diversity when the multipath signal is greater than the diversity signal. This disable diversity signal is encoded in a dedicated control channel reverse link. The disable diversity signal is transmitted by transmit amplifier circuit 718 through diplexer circuit 702 and mobile antenna 212 to disable diversity at the base station. The base station subsequently informs the mobile receiver when diversity is disabled for a specific antenna and transmitted frame.

Figure 3:
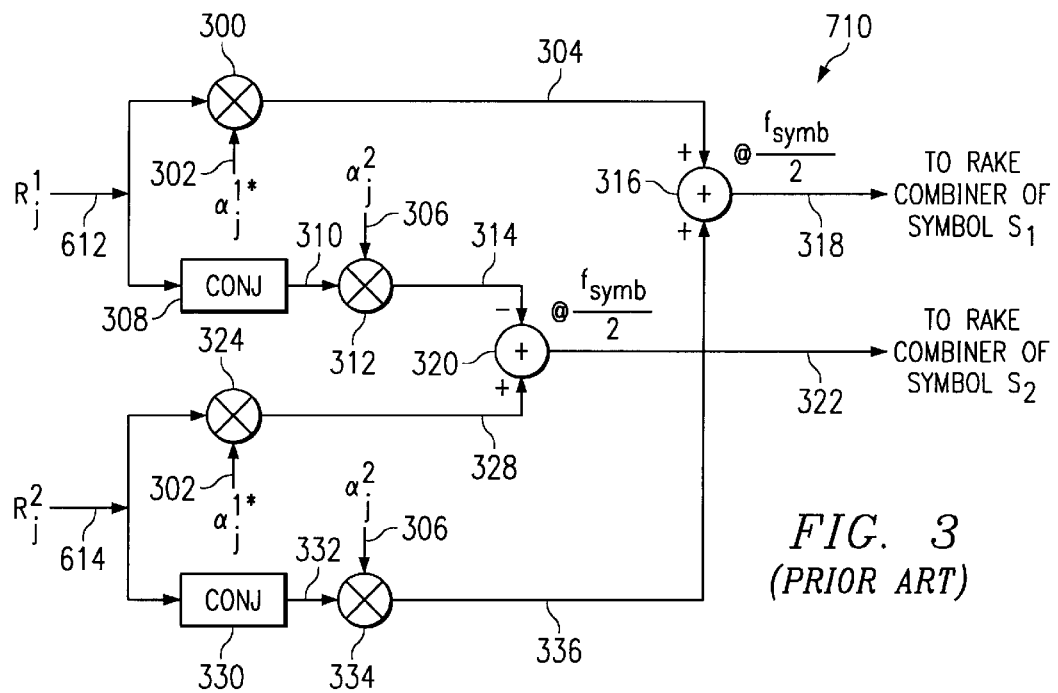
FIG. 3 is a schematic diagram of a phase correction circuit of the prior art that may be used with a receiver.

The mobile receiver applies the diversity signal on lead 728 to the frame and antenna indicated by the base station forward link. For example, the mobile receiver disables diversity at the phase correction circuit (FIG. 3) at a time corresponding to the first non-diversity frame by setting channel estimate signal $\alpha_j^2$ at lead 306 to zero. This produces a zero-value complex multiplication product on leads 314 and 336, respectively. The sums produced by circuits 316 and 320 on leads 318 and 322, therefore, are the same as input signals on leads 304 and 328, respectively. These signals are routed to rake combiner circuit 712. The rake combiner circuit 712 produces non-diversity soft symbol estimates as in equations [7–8]. These non-diversity soft symbol estimates are similar to the diversity soft symbol estimates of equations [5–6] except that complex multiplication products corresponding to channel estimate signal $\alpha_j^2$ are eliminated. The soft symbol estimates are then applied to the Viterbi decoder circuit 714 to produce the received signal on lead 716.

$$\tilde{S}_1 = \sum_{j=1}^{L} R_j^1 \alpha_j^{1*} \qquad [7]$$

$$\tilde{S}_2 = \sum_{j=1}^{L} R_j^2 \alpha_j^{1*} \qquad [8]$$

The base station continues non-diversity transmission until a time when the mobile receiver detects a multipath signal below the threshold signal. Comparator circuit 726 detects this sub-threshold multipath signal and informs the base station to enable diversity. The base station subsequently informs the mobile receiver of the next frame that will employ STTD or other diversity. The mobile receiver then applies the current diversity signal on lead 728 to the corresponding frame to produce diversity channel estimates on leads 734 and 736, respectively.

This switching between diversity and non-diversity modes is highly advantageous for several reasons. First, the threshold signal establishes an upper limit of complex multiply and add operations corresponding to each received symbol, thereby limiting hardware requirements. Second, diversity switching is compatible with existing phase correction circuitry by setting appropriate channel estimate signals to zero. Third, the threshold value is programmable so that diversity may be disabled for fewer multipaths in response to a strong received signal. Finally, gain enhancement of diversity diminishes with increasing multipaths above the threshold value. Thus, there is no disadvantage to non-diversity above this threshold value.

Figure 4B:
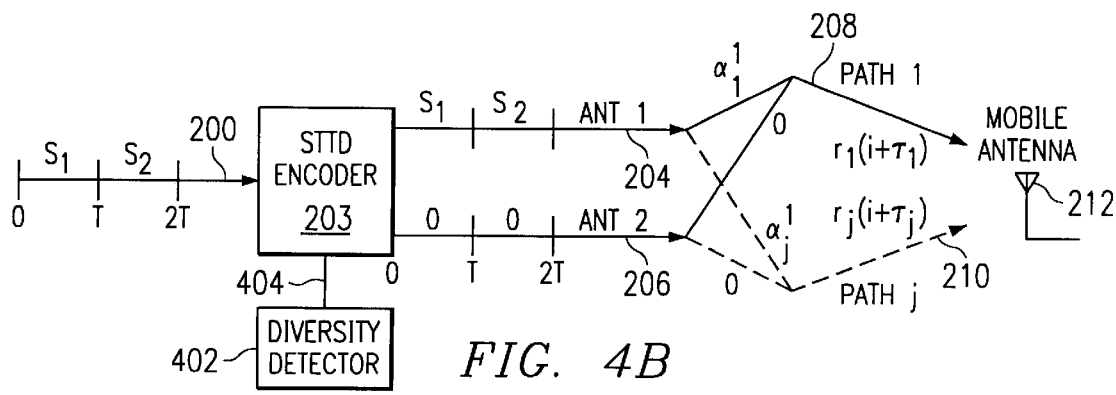
FIG. 4B is a block diagram showing signal flow in an STTD encoder of a second embodiment of the present invention with diversity disabled.

Although the invention has been described in detail with reference to its preferred embodiment, it is to be understood that this description is by way of example only and is not to be construed in a limiting sense. Referring to FIG. 4B, for example, there is a block diagram of signal flow in an STTD encoder of a second embodiment of the present invention that may be used with the transmitter of FIG. 1. Diversity detector circuit 402 receives a diversity signal from a mobile receiver indicating that diversity is to be enabled or disabled as previously described. The diversity detector latches the diversity signal and applies it to STTD encoder circuit 203 via lead 404. The STTD encoder operates in diversity mode as previously described with respect to FIG. 2 for a first state of the diversity signal. In response to a second state of the diversity signal, however, the STTD encoder produces symbol $S_1$ on lead 204 at symbol time T, and symbol $S_2$ on lead 204 at symbol time 2T. The STTD encoder suspends transmission of lead 206 during non-diversity. Thus, base station transmission is restricted to the antenna corresponding to lead 204. This effectively sets channel estimate signal $\alpha_j^2$ to zero at the base station and produces the same soft symbol estimate at the output of rake combiner circuit 712 as in equations [7–8].

In another embodiment of the present invention, the mobile unit may consider more variables than a number of multipaths from the base station to estimate signal gain. The mobile unit may employ a lookup table that is programmed to select diversity or non-diversity modes based on one or more of these variables. For example, the mobile unit may consider a number of multipaths as well as the average power of the received signal from the multipaths as illustrated in Table I.

TABLE I

| P/L | 1 | 2 | 3 | 4 | 5 | 6 | 7 |
|---|---|---|---|---|---|---|---|
| $P_1$ | STTD | STTD | STTD | STTD | STTD | STTD | ND |
| $P_2$ | STTD | STTD | STTD | STTD | STTD | ND | ND |
| $P_3$ | STTD | STTD | STTD | STTD | ND | ND | ND |

Table I includes a vertical index of received signal power having exemplary values increasing from $P_1$ to $P_3$ and a horizontal index of received signal multipaths. In operation, the mobile unit receives multipath signals from the base station having an average power. The number of these multipath signals and the average power are used as indices to Table I. For example, six multipaths at an average power level $P_1$ would cause the mobile unit to operate under STTD. Alternatively, an increase to either seven multipaths or power level $P_2$ would cause the mobile unit to request non-diversity (ND) from the base station as previously described.

In yet another embodiment of the present invention, the programmable threshold signal may apply hysteresis at lead 724 of comparator circuit 726. For example, a multipath signal greater than or equal to the threshold signal value of six produces a non-diversity signal at lead 728. The logic state of this non-diversity signal then reduces the threshold signal to four. The multipath signal must then decrease to less than four to enable diversity. Likewise, a subsequent change of logic state of the diversity signal to enable diversity increases the threshold signal to six.

It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed:

1. A communication circuit, comprising:

a detector circuit coupled to receive a first signal, the detector circuit arranged to produce a multipath signal corresponding to a number of paths of the first signal; and a comparator circuit coupled to receive the multipath signal and a threshold signal, the comparator circuit arranged to produce a diversity signal in response to a comparison of the multipath signal and the threshold signal, the diversity signal having a first logic state for enabling diversity and having a second logic state for disabling diversity.

2. A communication circuit as in claim 1, wherein the number of paths comprises multiple signal paths from a plurality of antennas of a base station.

3. A communication circuit as in claim 1, wherein the multipath signal further corresponds to an estimated gain of the first signal in response to at least one of transmit diversity and no transmit diversity.

4. A communication circuit as in claim 1, wherein the multipath signal further corresponds to received power of the first signal.

5. A communication circuit as in claim 1, wherein the threshold signal is programmable.

6. A communication circuit as in claim 5, wherein the threshold signal has a first value corresponding to the first logic state of the diversity signal and a second value corresponding to the second logic state of the diversity signal.

7. A communication circuit as in claim 1, wherein the first logic state of the diversity signal directs a base station to transmit from a plurality of antennas and wherein the second logic state of the diversity signal directs the base station to transmit from a single antenna.

8. A communication circuit as in claim 1, wherein the first logic state of the diversity signal directs a base station to transmit from a plurality of antennas and wherein the second logic state of the diversity signal directs the base station to transmit a same signal from a plurality of antennas.

9. A communication circuit as in claim 1, wherein the first logic state for enabling diversity comprises enabling STTD.

10. A communication circuit coupled to receive a diversity signal, the communication circuit comprising:

an encoder circuit coupled to receive a first signal, the encoder circuit arranged to produce a second signal comprising at least one of a complement and a conjugate of the first signal; and an output circuit arranged to produce the first signal and the second signal in response to a first logic state of the diversity signal, the output circuit arranged to produce the first signal and not produce the second signal in response to a second logic state of the diversity signal.

11. A communication circuit as in claim 10, further comprising a modulator circuit coupled to receive the first and second signals, the modulator circuit arranged to modulate each of the first and second signals with a channel orthogonalization code.

12. A communication circuit as in claim 10, wherein the diversity signal is received from a mobile transmitter.

13. A communication circuit as in claim 10, wherein first and second signals are STTD signals.

14. A communication circuit as in claim 10, wherein the output circuit comprises a transmit circuit, the transmit circuit arranged to produce the first signal from a first antenna and the second signal from a second antenna in response to the first logic state of the diversity signal, the transmit circuit arranged to produce the first signal from the first antenna and not produce the second signal from the second antenna in response to the second logic state of the diversity signal.

15. A communication circuit as in claim 14, wherein the transmit circuit produces the first signal from the second antenna when it does said not produce the second signal from the second antenna.

16. A communication circuit as in claim 14, wherein the transmit circuit does not produce a signal from the second antenna when it does said not produce the second signal from the second antenna.

17. A method of switching between diversity and non-diversity modes in a communication circuit, comprising the steps of:

receiving a first signal from a source external to the communication circuit;

producing a multipath signal corresponding to a number of paths of the first signal from a plurality of transmit antennas at the source external;

comparing the multipath signal to a threshold signal;

producing a diversity signal having a first value when the multipath signal is greater than the threshold signal; and producing a diversity signal having a second value different from the first value when the multipath signal is less than the threshold signal.

18. A method of switching between diversity and non-diversity modes in a communication circuit, comprising the steps of:

receiving a first signal from a source external to the communication circuit;

producing a multipath signal corresponding to a number of paths of the first signal from the source external;

comparing the multipath signal to a threshold signal;

producing a diversity signal having a first value when the multipath signal is greater than the threshold signal and transmitting the diversity signal to the source external; and producing a diversity signal having a second value different from the first value when the multipath signal is less than the threshold signal and transmitting the diversity signal to the source external.

* * * * *